United States Patent
Patel et al.

(10) Patent No.: US 7,839,108 B2
(45) Date of Patent: Nov. 23, 2010

(54) ELECTRIC MOTOR STATOR WINDING TEMPERATURE ESTIMATION

(75) Inventors: Nitinkumar R. Patel, Cypress, CA (US); Yo Chan Son, Torrance, CA (US); Silva Hiti, Redondo Beach, CA (US); Steven E. Schulz, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 381 days.

(21) Appl. No.: 12/019,395

(22) Filed: Jan. 24, 2008

(65) Prior Publication Data
US 2009/0189561 A1 Jul. 30, 2009

(51) Int. Cl.
*H02H 5/04* (2006.01)

(52) U.S. Cl. .................. 318/432; 318/434; 318/700; 318/400.01; 318/799; 318/801; 318/802; 318/806; 361/23; 361/24; 361/25; 361/27

(58) Field of Classification Search .................. 318/432, 318/434, 700, 400.01, 799, 801, 802, 806; 361/23, 24, 25, 27
See application file for complete search history.

(56) References Cited

U.S. PATENT DOCUMENTS

| | | | | |
|---|---|---|---|---|
| 4,876,492 A | * | 10/1989 | Lester et al. | 318/400.08 |
| 5,079,488 A | * | 1/1992 | Harms et al. | 318/471 |
| 5,227,703 A | * | 7/1993 | Boothe et al. | 318/139 |
| 5,712,802 A | * | 1/1998 | Kumar et al. | 702/132 |
| 6,247,437 B1 | * | 6/2001 | Yamaguchi et al. | 123/179.3 |
| 6,854,881 B2 | * | 2/2005 | Nada | 374/169 |
| 6,986,688 B1 | * | 1/2006 | Jansen | 440/1 |
| 7,071,649 B2 | * | 7/2006 | Shafer et al. | 318/783 |
| 7,622,883 B2 | * | 11/2009 | Kaizuka et al. | 318/730 |

* cited by examiner

*Primary Examiner*—Rita Leykin
(74) *Attorney, Agent, or Firm*—Ingrassia Fisher & Lorenz, P.C.

(57) ABSTRACT

A temperature estimation controller and methods are provided for controlling a torque command to prevent overheating of one or more of a plurality of phases of a permanent magnet motor. The temperature estimation controller includes a low speed temperature estimation module, a transition module and a temperature dependent torque command derater block. The low speed temperature estimation module determines a stator temperature of each of a plurality of phases of the permanent magnet motor in response to first thermal impedances measured for each of the plurality of phases with respect to a thermal neutral. The transition module is coupled to the low speed temperature estimation module and outputs the stator temperature of each of a plurality of phases of the permanent magnet motor as determined by the low speed temperature estimation module when a detected speed of the permanent magnet motor is less than a first predetermined speed. The temperature dependent torque command derater block is coupled to the transition module and derates the torque command in response to the stator temperature of one or more of the plurality of phases.

18 Claims, 7 Drawing Sheets

ELECTRIC MOTOR STATOR WINDING TEMPERATURE ESTIMATION

TECHNICAL FIELD

The present invention generally relates to electric motor systems, and more particularly relates to a method and an apparatus for estimating the temperature of stator windings in an electric motor.

BACKGROUND OF THE INVENTION

A permanent magnet motor in an electric motor system can be damaged when the temperature of stator windings of the permanent magnet motor become overheated. Typically, the temperature of the stator windings is measured by a temperature measurement sensor, such as a thermistor, installed on one of the phases of the electric motor stator winding. Assuming balanced three phase currents are flowing in the stator windings, the single temperature measurement sensor may adequately estimate the temperature of all three phases. At or near zero speed, however, no current may be flowing in the phase of the electric motor stator winding where the sensor is installed or, at certain speeds, unbalanced currents may be flowing in the three phases of the stator windings. Under these conditions, the single temperature measurement sensor will not correctly report the actual temperature of the electric motor and, consequently, the electric motor can be damaged by overheating.

Accordingly, it is desirable to provide a method and apparatus for preventing overheating damage to stator windings of the electric motor. In addition, it is desirable to provide temperature sensing for the electric motor at all speeds including at or near zero speed. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A temperature estimation controller is provided for preventing overheating damage to stator windings of a permanent magnet motor. The temperature estimation controller includes a low speed temperature estimation module, a transition module and a temperature dependent torque command derater block. The low speed temperature estimation module determines a stator temperature of each of a plurality of phases of the permanent magnet motor in response to first thermal impedances measured for each of the plurality of phases with respect to a thermal neutral. The transition module is coupled to the low speed temperature estimation module and outputs the stator temperature of each of a plurality of phases of the permanent magnet motor as determined by the low speed temperature estimation module when a detected speed of the permanent magnet motor is less than a first predetermined speed. The temperature dependent torque command derater block is coupled to the transition module and derates the torque command in response to the stator temperature of one or more of the plurality of phases.

A method is provided for controlling a torque command to prevent overheating of one or more of a plurality of phases of a permanent magnet motor. The method includes the steps of determining whether a detected speed of the permanent magnet motor is less than a first predetermined speed, determining a stator temperature of each of the plurality of phases in response to first thermal impedances measured for each of the plurality of phases with respect to a thermal neutral when the detected speed of the permanent magnet motor is less than the first predetermined speed, and derating the torque command in response to the stator temperature of one or more of the plurality of phases.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
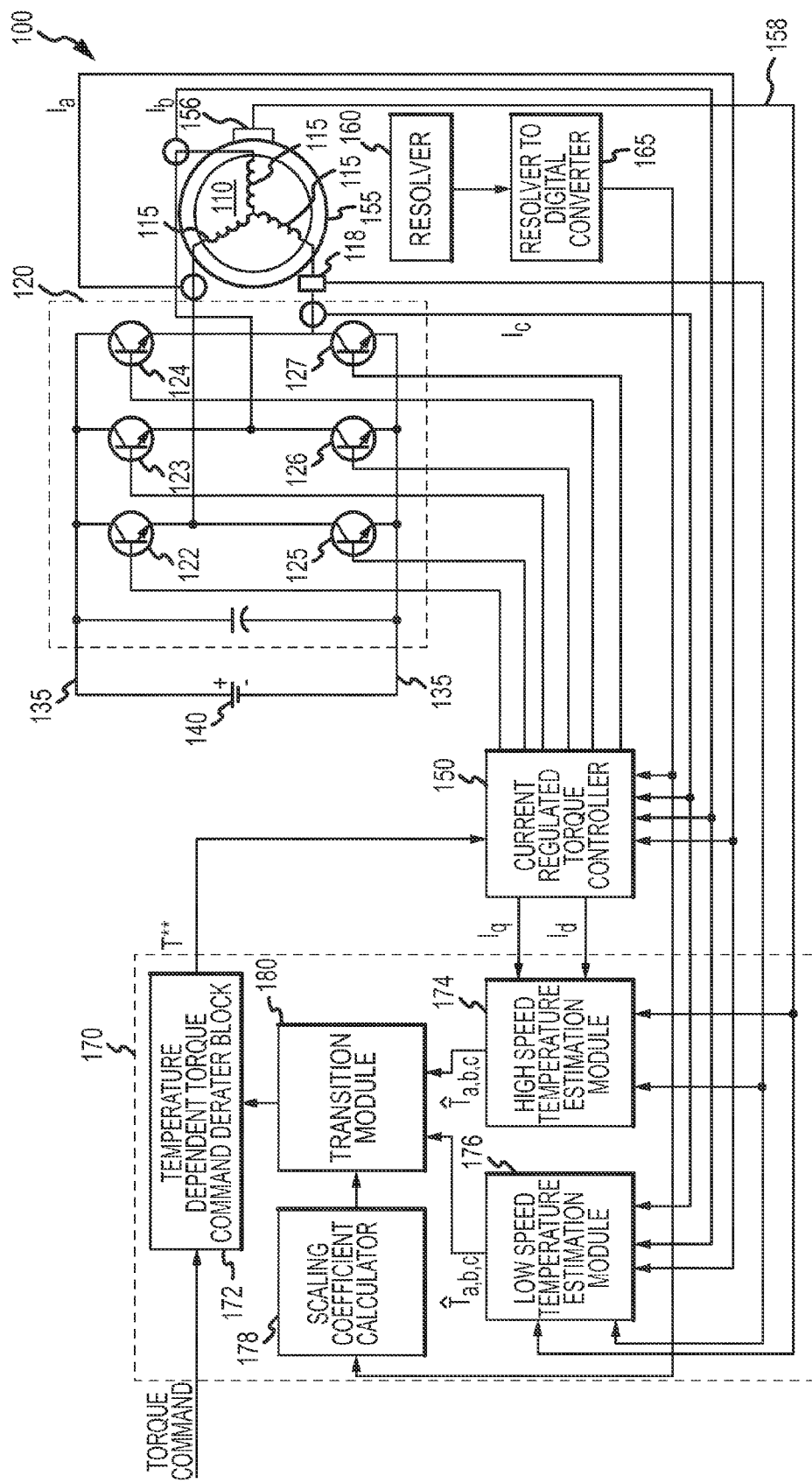
FIG. 1 illustrates a block diagram of an electric motor system in accordance with an embodiment of the present invention.

Referring to FIG. 1, an electric motor system 100 in accordance with an embodiment of the present invention includes a three-phase alternating current (AC) synchronous electric machine 110, such as a synchronous reluctance machine or a permanent magnet electric motor, which operates in response to signals from an inverter 120. The inverter 120 providing electric control for the electric motor 110 is connected between direct current (DC) bus lines 135 of a power source 140. The inverter 120 includes transistors 122 to 127, such as Insulated Gate Bipolar Transistors (IGBTs), and operates in response to signals from a current regulated torque controller 150 to gates thereof to provide voltage to each phase 115 of the motor 110, each of the transistor pairs 122/125, 123/126 and 124/127 forming a phase leg of the inverter 120. A thermistor 118 is coupled to one of the phases 115 to measure the temperature of the winding of that phase 115. A coolant 155, such as motor oil, surrounds and cools the motor 110 during operation thereof and a temperature signal generator 156 determines the temperature of the coolant 155 from a thermocouple 157 within the coolant 155 and provides a digital signal representation of the temperature of the coolant 155 on the line 158.

A resolver 160 (or similar sensing device) is coupled to the motor 110 for measuring the rotor position and detecting the speed thereof. A resolver-to-digital converter 165 converts the signals from the resolver 160 to digital signals and provides those digital representations of angular position and detected speed of the rotor of the AC synchronous electric motor 110 to the current regulated torque controller 150. The output of the current regulated torque controller 150 is coupled to the gates of each of the transistors 122 to 127 for providing a motor control signal to the inverter 120 as operational control signals for the transistors 122 to 127.

In accordance with the embodiment, a temperature estimation controller 170 includes a temperature dependent torque command derater block 172, a high speed temperature estimation module 174, a low speed temperature estimation module 176, a scaling coefficient calculator 178 and a transition module 180.

The high speed temperature estimation module 174 receives synchronous frame currents $I_d$, $I_q$ from the current regulated torque controller 150 and estimates the phase temperatures ($T_a$, $T_b$, $T_c$) of the windings of the phases 115 in response to the synchronous frame currents and the temperature of one of the phases 115 as measured by the thermistor 118. The low speed temperature estimation module 176 receives the detected current values $I_a$, $I_b$, $I_c$ and estimates the phase temperatures ($T_a$, $T_b$, $T_c$) of the windings of the phases 115 in response to the current values and the temperature of the coolant 155 as provided on line 158.

The scaling coefficient calculator 178 receives a digital signal representing the detected speed of the motor 110 from the resolver-to-digital converter 165 and calculates scaling coefficients as described in more detail below. The scaling coefficients are provided from the calculator 178 to the transition module 180 along with the estimated phase temperatures ($T_a$, $T_b$, $T_c$) from the high speed temperature estimation module 174 and the low speed temperature estimation module 176. The transition module 180 modifies the estimated phase temperatures ($T_a$, $T_b$, $T_c$) in accordance with the scaling coefficients to derive phase temperatures ($T_a$, $T_b$, $T_c$) for provision to a first input of the temperature dependent torque command derater block 172.

A torque control signal (torque command T*) is provided to a second input of the temperature dependent torque command derater block 172. The temperature dependent torque command derater block 172 modifies the torque command in response to the phase temperatures ($T_a$, $T_b$, $T_c$) to generate a temperature derated torque control signal. The current regulated torque controller 150 receives current signals from each phase 115 of the motor 110 and, in accordance with the present embodiment, modifies the currents at the phases 115 of the motor 110 in response to the temperature derated torque control signal received from the temperature dependent torque command derater block 172 to generate the operational control signals provided to the inverter 120.

Accordingly, the operational control signals apply the gain represented by the temperature derated torque control signal to the command signals/voltage applied to the gates of the transistors 122 to 127. Thus, in accordance with the present embodiment, the currents at each of the phases 115 is received and modified by the current regulated torque controller 150 in response to the temperature derated torque control signal to provide appropriate gain to the operational control signals while integrating a temperature dependent torque derating into the control structure at all speeds including modification of the torque command at speeds close to zero speed by the scaled phase temperatures generated by the low speed temperature estimation block 176 as scaled by the coefficient provided to the transition module 180 from the scaling coefficient calculator 178.

Conventionally, only one temperature measurement sensor (e.g. the thermistor 118) is installed on one of the three phases 115 of the motor stator winding. At zero speed, if current is flowing in the phases 115 where the thermistor 118 is not installed, the actual temperature of those phases 115 will not be correctly reported to a conventional motor controller to protect those phases 115 from over heating. Thus, estimating stator temperature of each phase 115 and comparing it with a predefined temperature threshold value for derating the torque command can prevent overheating of the stator windings at zero speed.

Figure 2:
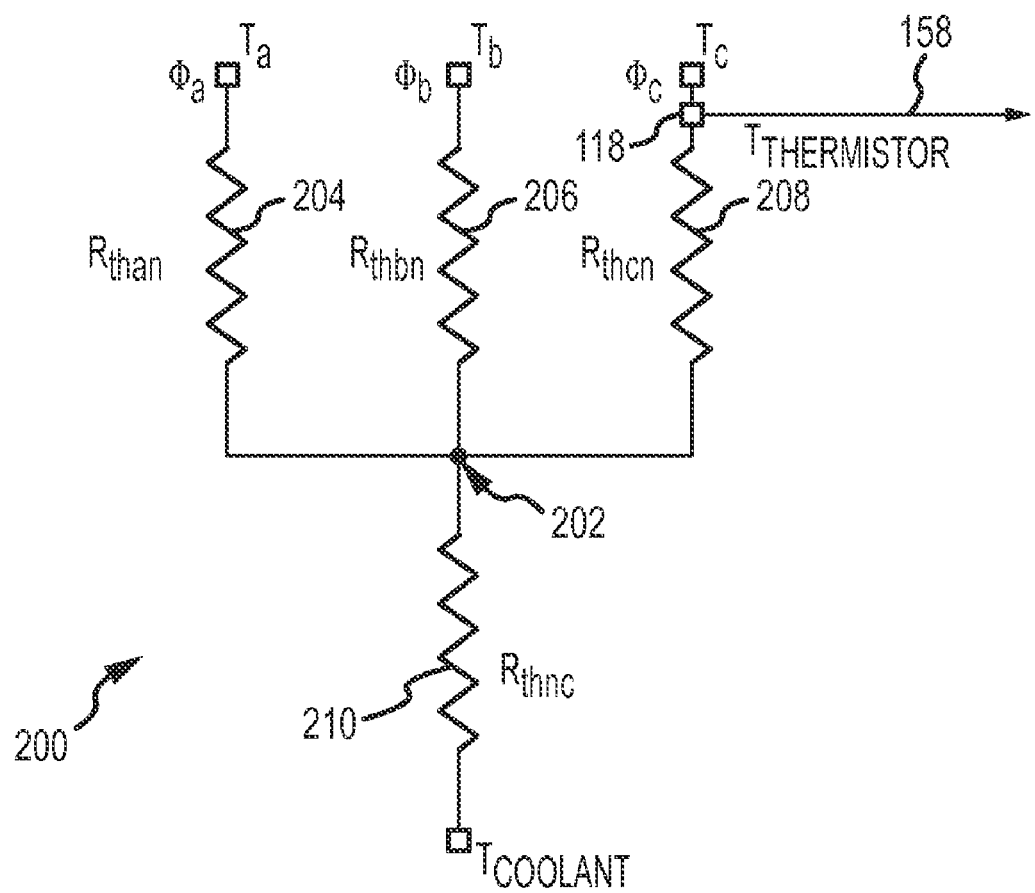
FIG. 2 illustrates a circuit diagram representation of the low speed temperature estimation algorithm in accordance with the embodiment of the present invention.

Referring to FIG. 2, a circuit diagram representation of a motor thermal network 200 utilized for low speed temperature estimation in accordance with the embodiment of the present invention determines the temperatures $T_a$, $T_b$ and $T_c$ at each of the phases 115 (i.e., $\Phi_a$, $\Phi_b$, $\Phi_c$) of the motor 110.

The temperature of the stator phase windings 115 at and near zero speed of the motor 115 are measured by calculating a thermal impedance ($R_{th}$) between each of the phases 115 and a thermal neutral 202 (i.e., a thermal impedance 204 ($R_{than}$) between the temperature $T_a$ of a first phase $\Phi_a$ and the thermal neutral 202, a thermal impedance 206 ($R_{thbn}$) between the temperature $T_b$ of a second phase $\Phi_b$ and the thermal neutral 202, and a thermal impedance 208 ($R_{thcn}$) between the temperature $T_c$ of a third phase $\Phi_c$ and the thermal neutral 202) and a thermal impedance ($R_{thnc}$) between the thermal neutral 202 and the temperature of the coolant 155 (which has a temperature $T_{Coolant}$ as measured by the thermocouple 157 (FIG. 1)).

Power dissipation in the motor due to copper loss and iron loss can be expressed using Equations (1) and (2) respectively.

$$P_{cu} = R_{DC} I^2, \quad R_{DC} = \frac{N_c N l_{turn}}{A_{turn} \sigma_{cu}} \tag{1}$$

where:
$R_{DC}$ is the DC resistance per phase;
$N_c$ is the number of coils in a series;
$N$ is the Number of turns;
$l_{turn}$ is the length of one turn;
$A_{turn}$ is the Area of one turn; and
$\sigma_{cu}$ is the conductivity of copper.

$$P_{iron} = P_h + P_e = \varepsilon_h \left(\frac{f}{f_n}\right) B_m^a + \varepsilon_e \left(\frac{f}{f_n}\right)^2 B^2 \tag{2}$$

where:
$P_h$ is the power dissipation due to hysteresis losses; and
$P_e$ is the power dissipation due to eddy current losses.

As those skilled in the art will deduce from Equations (1) and (2), most of the heat generated in the stator windings at zero and low operating speeds is due to copper loss. Thus, in accordance with the present embodiment, heat generated in the stator windings due to iron losses is ignored. The heat generated in the stator windings due to copper losses can be calculated using the stator current and thermal impedances as shown in Equation (1) above.

The rise in the temperature in each of the three phases 115 is estimated using the thermal network 200 and a calculated copper loss in each respective phase 115. Referring to the simplified motor thermal model 200 the temperature rise in the stator phase windings 115 of the three phase AC motor 110 can be estimated using (a) the thermal impedance $R_{than}$ 204, (b) the thermal impedance $R_{thbn}$ 206, (c) the thermal impedance $R_{thcn}$ 208, (d) the thermal impedance $R_{thnc}$ 210, and (e) a temperature measured by the thermistor 118 installed in the Phase C winding. The copper loss in each phase is calculated as a function of stator RMS current, $I_a$, $I_b$, $I_c$ and stator phase resistance. Accordingly, the temperature estimation at low speeds is calculated by the low speed temperature estimation module 176 using Equations (3), (4) and (5).

$$T_{sa} = R_{than}\left(\frac{1+T_{za}s}{1+2\xi_a T_{wa}s+(T_{wa})^2}\right)R_{sa}I_a^2 + \left(\frac{R_{thnc}}{\tau_{thnc}s+1}\right)\sum_{i=a,b,c}R_{si}I_i^2 + T_{coolant} \quad (3)$$

$$T_{sb} = R_{thbn}\left(\frac{1+T_{zb}s}{1+2\xi_b T_{wb}s+(T_{wb})^2}\right)R_{sb}I_b^2 + \left(\frac{R_{thnc}}{\tau_{thnc}s+1}\right)\sum_{i=a,b,c}R_{si}I_i^2 + T_{coolant} \quad (4)$$

$$T_{sc} = R_{thcn}\left(\frac{1+T_{zc}s}{1+2\xi_c T_{wc}s+(T_{wc})^2}\right)R_{sc}I_c^2 + \left(\frac{R_{thnc}}{\tau_{thnc}s+1}\right)\sum_{i=a,b,c}R_{si}I_i^2 + T_{coolant} \quad (5)$$

The first terms in Equations (3), (4) and (5) represent the temperature rise due to the thermal impedance of each phase 204, 206, 208 with respect to the thermal neutral 202, while the second terms in Equations (3), (4) and (5) represent the temperature rise due to the thermal impedance 210 between the thermal neutral 202 and the coolant 155.

Figure 3:
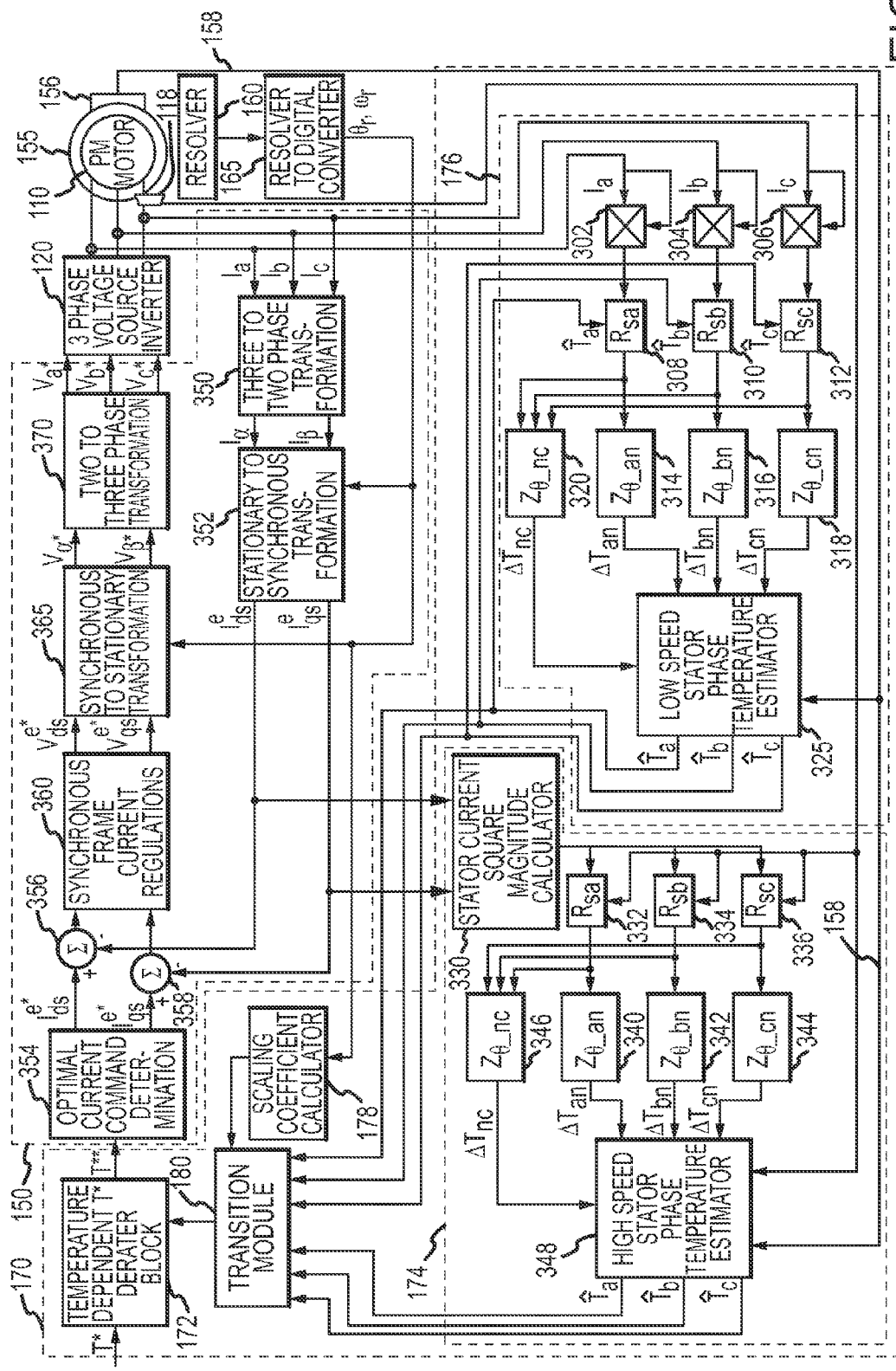
FIG. 3 illustrates a more detailed diagram of the temperature estimation controller of the electric motor system of FIG. 1 in accordance with the embodiment of the present invention.

Referring to FIG. 3, exemplary circuitry blocks for performing the calculation and other functions in accordance with the present embodiment are depicted. The AC currents $I_a$, $I_b$ and $I_c$ are supplied to combiners 302, 304, 306, respectively, of the low speed temperature estimation module 176. The combiners 302, 304, 306, through the provision of the currents $I_a$, $I_b$ and $I_c$ to each of two inputs thereto, generates waveforms equivalent to the AC RMS currents of each of the phases 115 and provides the AC RMS currents to blocks 308, 310 and 312, respectively.

Block 308 calculates the stator phase resistance $R_{sa}$ of the stator wiring of phase a (phase 204) in response to the temperature $T_a$ of the stator wiring of phase a and multiplies it with the AC RMS value of the stator current $I_a^2$ from the output of the combiner 302, providing digital values of the product thereof to block 314 for calculation of the temperature rise due to the thermal impedance $Z_{\theta\_an}$ of phase 204. Likewise, blocks 310 and 312 calculate the stator phase resistances $R_{sb}$ and $R_{sc}$ respectively, from the temperatures $T_b$ and $T_c$ of the stator wirings of phases b and c (phases 206, 208), respectively, and multiply them with the respective outputs of combiners 304, 306. The outputs of blocks 310 and 312 are provided as digital values to blocks 316 and 318, respectively, for the calculation of the temperature rise due to the thermal impedances $Z_{\theta\_bn}$, $Z_{\theta\_cn}$ of phases 206 and 208.

Outputs of blocks 308, 310 and 312 are also provided to inputs of block 320 for calculation of the temperature rise due to the thermal impedance $Z_{\theta\_nc}$ 210 between the thermal neutral 202 and the coolant 155. The outputs of blocks 314, 316, 318 and 320 as well as the digital signal representing the temperature $T_{Coolant}$ of the coolant 155 on line 158 are provided to inputs of a low speed stator phase temperature estimator 325 for estimation of the temperatures $T_a$, $T_b$ and $T_c$ of the three phases 115 of the motor 110 in response to the calculated copper loss in the three phases 115 in accordance with Equations (3), (4) and (5).

Turning now to the high speed temperature estimation module 174, the calculation of the temperatures of the three phases 115 is executed approximately every 10 msec and sampling an AC current signal at this high fundamental frequency would reduce the accuracy of the copper loss calculations. Accordingly, synchronous frame digital current signals $I_d$ and $I_q$ (i.e., the d and q axes currents) are used to calculate the copper losses. Also, when the motor 110 is rotating, it is assumed that the heat distribution between the three stator windings of the three phases 115 is almost equivalent and that the temperature measured by the thermistor 118 which is mounted in one of the three windings should represent a correct temperature rise in all of the three phases 115. Thus, stator phase resistances $R_{sa}$, $R_{sb}$ and $R_{sc}$ are calculated using the thermistor measurement. The synchronous frame digital current signals $I_d$ and $I_q$ are provided from the current regulated torque controller 150 to a stator current square magnitude calculator 330 of the high speed temperature estimation module 174. The stator current square magnitude calculator 330 calculates the RMS value of the currents $I_s^2$ and provides the RMS of the currents to blocks 332, 334 and 336.

Blocks 332, 334 and 336 calculate the stator phase resistances $R_{sa}$, $R_{sb}$ and $R_{sc}$ of the stator wiring of the phases 115 in response to the measured by the thermistor 118 $T_{Thermistor}$ of one of the stator wirings of the phases 115 and multiplies it with the RMS value of the stator currents $I_s^2$ from the output of the stator current square magnitude calculator 330. The outputs of blocks 332, 334 and 336 are provided to blocks 340, 342 and 344, respectively, for the calculation of the temperature rise due to the thermal impedances $Z_{\theta\_an}$, $Z_{\theta\_bn}$, $Z_{\theta\_cn}$ of phases 206 and 208. Outputs of blocks 332, 334 and 336 are also provided to inputs of block 346 for calculation of the temperature rise due to the thermal impedance $Z_{\theta\_nc}$ 210 between the thermal neutral 202 and the coolant 155.

The outputs of blocks 340, 342, 344 and 346 as well as the digital signal representing the temperature $T_{Coolant}$ of the coolant 155 on line 158 and the signal $T_{Thermistor}$ from the thermistor 118 are provided to inputs of a high speed stator phase temperature estimator 348 for estimation of the temperatures $T_a$, $T_b$ and $T_c$ of the three phases 115 of the motor 110 in response to the calculated copper loss in the three phases 115 in accordance with Equations (3), (4) and (5).

The outputs $T_a$, $T_b$ and $T_c$ representing estimations of the stator winding temperatures of the windings of the three phases 115 as calculated by the high speed stator phase temperature estimator 348 and the low speed stator phase temperature estimator 325 are provided to inputs of the transition module 180. As described above, the scaling coefficient calculator 178 receives a digital signal representing the detected speed of the motor 110 from the resolver-to-digital converter 165 and calculates scaling coefficients. The scaling coefficients are provided from the calculator 178 to the transition module 180 and the transition module 180 modifies the estimated phase temperatures ($T_a$, $T_b$, $T_c$) in accordance with the scaling coefficients to derive phase temperatures ($T_a$, $T_b$, $T_c$) for provision to an input of the temperature dependent torque command derater block 172.

The current regulated torque control module 150 includes a three to two phase transformation block 350 which utilizes currents from the three phases 115 to generate two phase currents, $I_\alpha$ and $I_\beta$, in the stationary reference frame and a stationary to synchronous transformation block 352 transforms the currents $I_\alpha$ and $I_\beta$ to current values $I_{ds}^e$ and $I_{qs}^e$ (more simply represented as $I_d$ and $I_q$) in the synchronous reference frame, where the DC current values provide for easier calculation of the operational control signals in accordance with the present embodiment. As described above, the synchronous reference frame digital current values $I_d$ and $I_q$ are provided to the stator current square magnitude calculator 330. In addition, the synchronous reference frame digital current values $I_d$ and $I_q$ are provided to d and q phase summers 356 and 358, respectively.

The torque command T* is provided to the temperature dependent torque command derater block 172 for generation of the derated torque command signal T** in response to the phase temperatures ($T_a$, $T_b$, $T_c$) from the transition module 180 for prevention of overheating damage to the stator windings of the phases 115. In accordance with the present embodiment, the temperature dependent torque command derater block 172 derates (i.e., lowers) the torque command T* to derive the derated torque command T** in response to the detection of the stator temperature of one or more of the plurality of phases being higher than a predetermined temperature.

An optimal current command determination block 354 of the current regulated torque control module 150 generates two current commands in the synchronous reference frame, $I_{ds}^{e*}$ and $I_{qs}^{e*}$, from the derated torque command signal T** and combines the current commands $I_{ds}^{e*}$ and $I_{qs}^{e*}$ with the current values $I_d$ and $I_q$ at the d and q phase summers 356 and 358, respectively, for generation of current error signals. Synchronous frame current regulators 360 generate the synchronous frame operational signals having voltages $V_{ds}^{e*}$ and $V_{ds}^{e*}$.

A synchronous to stationary transformation block 365 transforms the synchronous frame operational signals $V_{ds}^{e*}$ and $V_{ds}^{e*}$ to two stationary frame operational signals $V_\alpha^*$ and $V_\beta^*$. A two to three phase transformation block 370 transforms the two stationary frame operational signals $V_\alpha^*$ and $V_\beta^*$ to three phase voltage operational signals $V_a^*$, $V_b^*$ and $V_c^*$ for provision to the respective three phase legs 122/125, 123/126 and 124/127 of the inverter 120. In this manner, the operational control signals for the inverter 120 are generated in response to the derated torque signal T** to protect overheating of the phases 115 the AC synchronous motor 110, even at low speeds.

Figure 4:
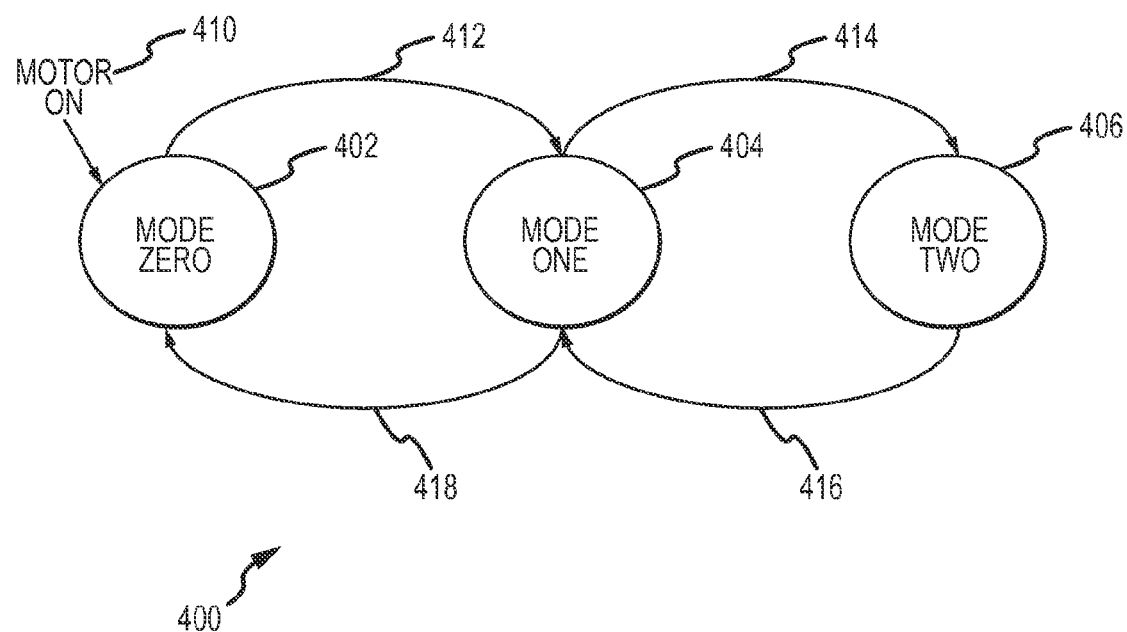
FIG. 4 illustrates a flow of the operation of the transition module of the temperature estimation controller of the electric motor system of FIG. 3 in accordance with the embodiment of the present invention.

Referring to FIG. 4, a flow 400 of the operation of the transition module 180 of the temperature estimation controller 170 in accordance with the present embodiment includes three modes of operation: Mode Zero 402, Mode One 404 and Mode Two 406. When the motor is started (i.e., Turned ON) 410, the transition module 180 operates in Mode Zero 402. Mode Zero 402 is active at and near zero speed (e.g. below approximately seventy-five revolutions per minute (rpm)). During Mode Zero 402, the transition module 180 provides estimated stator temperatures $T_a$, $T_b$ and $T_c$ as calculated by the low speed temperature estimation module 176 to the temperature dependent torque command derater block 172 for derating of the torque command T*.

Accordingly, the torque command T* is derated in response to the estimated stator temperatures $T_a$, $T_b$ and $T_c$ calculated in response to the thermal impedances measured for each of the plurality of phases by determining the copper loss in each of the phases 115, wherein the copper loss is calculated in response to the AC RMS current $I_a^2$, $I_b^2$ or $I_c^2$ and the stator phase resistance $R_{sa}$, $R_{sb}$ or $R_{sc}$ in each respective phase 115, the estimated temperature $T_a$, $T_b$ or $T_c$ being used to calculate the respective stator phase resistance $R_{sa}$, $R_{sb}$ or $R_{sc}$.

When the speed of the motor 110 becomes greater than a first predetermined speed, wherein in accordance with the present embodiment the first predetermined speed is a speed of approximately seventy-five rpm, the transition module 180 switches operation 412 from Mode Zero 402 to Mode One 404. During Mode One 404, the transition module 180 provides estimated stator temperatures $T_a$, $T_b$ and $T_c$ that are calculated as a combination of both the estimated stator temperatures calculated by the high speed temperature estimation module 174 and the estimated stator temperatures calculated by the low speed temperature estimation module 176 to the temperature dependent torque command derater block 172 for derating of the torque command T*. In other words, during Mode One 404, the temperature dependent torque command derater block 172 derates the torque command T* in response to the stator temperatures of the plurality of phases 115 as calculated by the high speed temperature estimation module 174 in response to the temperature of one of the phases measured by the thermistor 118 and the stator temperatures of the plurality of phases 115 as calculated by the low speed temperature estimation module 176 in response to the thermal impedances of the plurality of phases by determining the copper loss in each of the phases 115 (i.e., the AC RMS currents $I_a^2$, $I_b^2$ and $I_c^2$).

When the speed of the motor 110 becomes greater than a second predetermined speed, wherein in accordance with the present embodiment the second predetermined speed is a speed of approximately one hundred fifty rpm, the transition module 180 switches operation 414 from Mode One 404 to Mode Two 406. During Mode Two 406, the transition module 180 provides estimated stator temperatures $T_a$, $T_b$ and $T_c$ that are calculated by the high speed temperature estimation module 174 to the temperature dependent torque command derater block 172 for derating of the torque command T*. Thus, during Mode Two 406, the temperature dependent torque command derater block 172 derates the torque command T* in response to the stator temperatures of the plurality of phases 115 as calculated by the high speed temperature estimation module 174 in response to the temperature of one of the phases measured by the thermistor 118.

In a similar manner, when the speed of the motor 110 drops below the second predetermined speed, operation of the transition module 180 switches 416 from Mode Two 406 to Mode One 404 and when the speed of the motor 110 drops below the first predetermined speed, operation of the transition module 180 switches 418 from Mode One 404 to Mode Zero 402.

Figure 5:
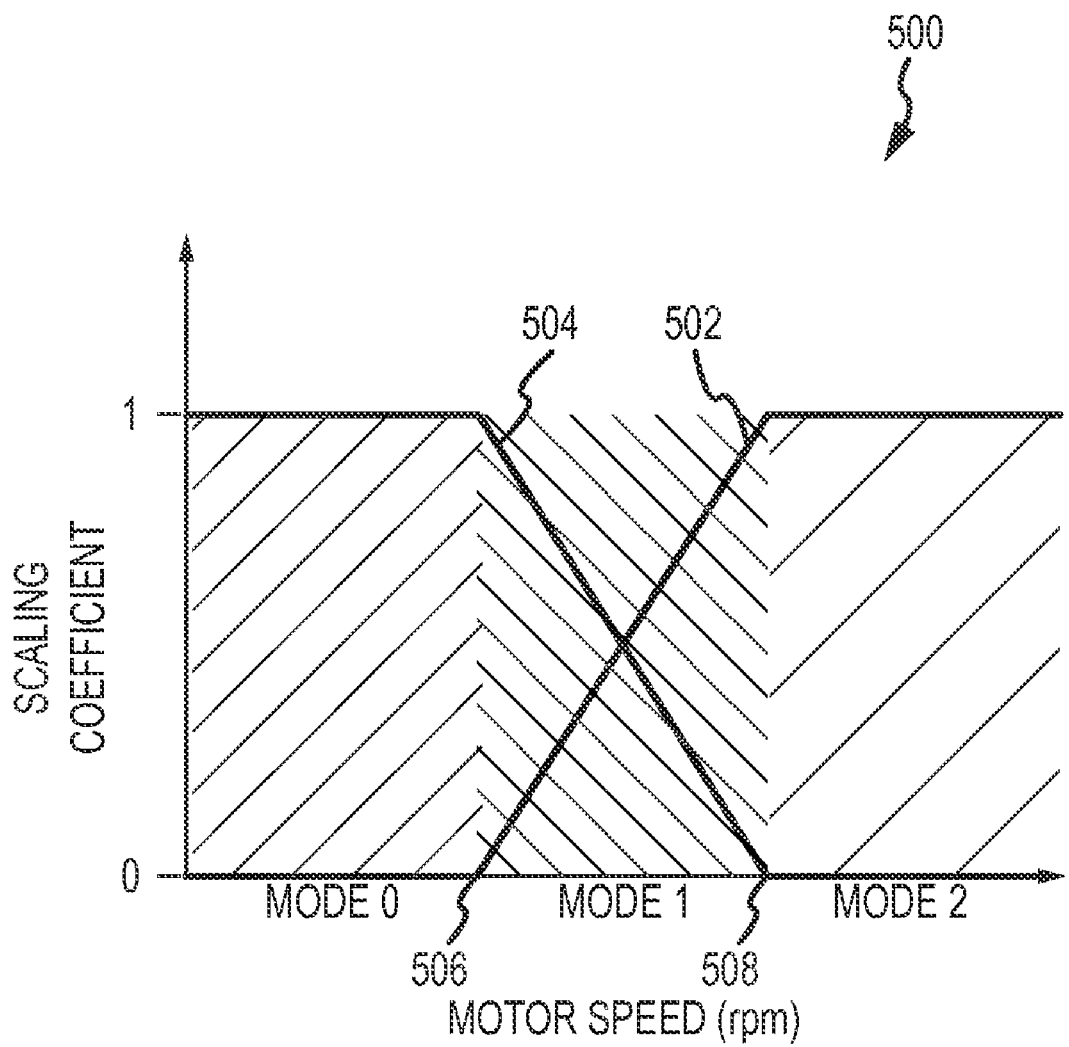
FIG. 5 illustrates a graph of the operation of the transition module of the electric motor system of FIG. 3 in accordance with the embodiment of the present invention.

In accordance with the present embodiment, the scaling coefficient calculator 178 calculates scaling coefficients in response to the speed of the motor 110 to allow the transition module 180 to smoothly transition between Mode Zero 402 and Mode Two 406 during Mode One 404. Referring to FIG. 5, a graph 500 of the operation of the transition module 180 in response to the scaling coefficient calculator 178 in accordance with the embodiment of the present invention is depicted.

As can be seen on the y-axis of the graph 500, the scaling coefficients calculated by the scaling coefficient calculator ranges from zero to one. The transition module 180 multiplies the estimated stator temperatures calculated by the high speed temperature estimation module 174 by a first scaling coefficient depicted on line 502, multiplies the estimated stator temperatures calculated by the low speed temperature estimation module 176 by a second scaling coefficient depicted on line 504, and provides the sum thereof to the temperature dependent torque command derater block 172.

Below the first predetermined speed 506, the first scaling coefficient 502 provided by the scaling coefficient calculator 178 to the transition module is zero and the second scaling coefficient 504 provided by the scaling coefficient calculator 178 to the transition module is one, so the sum of the estimated stator temperatures provided by the high speed and the low speed temperature estimation modules 174, 176 as scaled by the scaling coefficient is equal to the estimated stator temperatures calculated by the low speed temperature estimation module 176. Above the second predetermined speed 508, the first scaling coefficient 502 provided by the scaling coefficient calculator 178 to the transition module is one and the second scaling coefficient 504 provided by the scaling coefficient calculator 178 to the transition module is zero, so the sum of the estimated stator temperatures provided by the high speed and the low speed temperature estimation modules 174, 176 as scaled by the scaling coefficient is equal to the estimated stator temperatures calculated by the high speed temperature estimation module 174.

During the transition period of Mode One 404, the transition module 180 provides estimated stator temperatures $T_a$, $T_b$ and $T_c$ that are calculated as a combination of a fraction of the estimated stator temperatures calculated by the high speed temperature estimation module 174 and a fraction of the estimated stator temperatures calculated by the low speed temperature estimation module 176 to the temperature dependent torque command derater block 172 for derating of the torque command T*. A linear slope of the scaling coefficients on lines 502 and 504 provide a linear transition of the temperature estimations between Mode Zero 402 and Mode Two 406. While a linear transition is shown in the graph 500 of FIG. 5, other non-linear functions could be utilized by the transition module 180 for the transition between Mode Zero 402 and Mode Two 406 without departing from the spirit of the invention, the design/programming of the scaling coefficient calculator 178 controlling the linearity or non-linearity of the intermodal transition.

Figure 6:
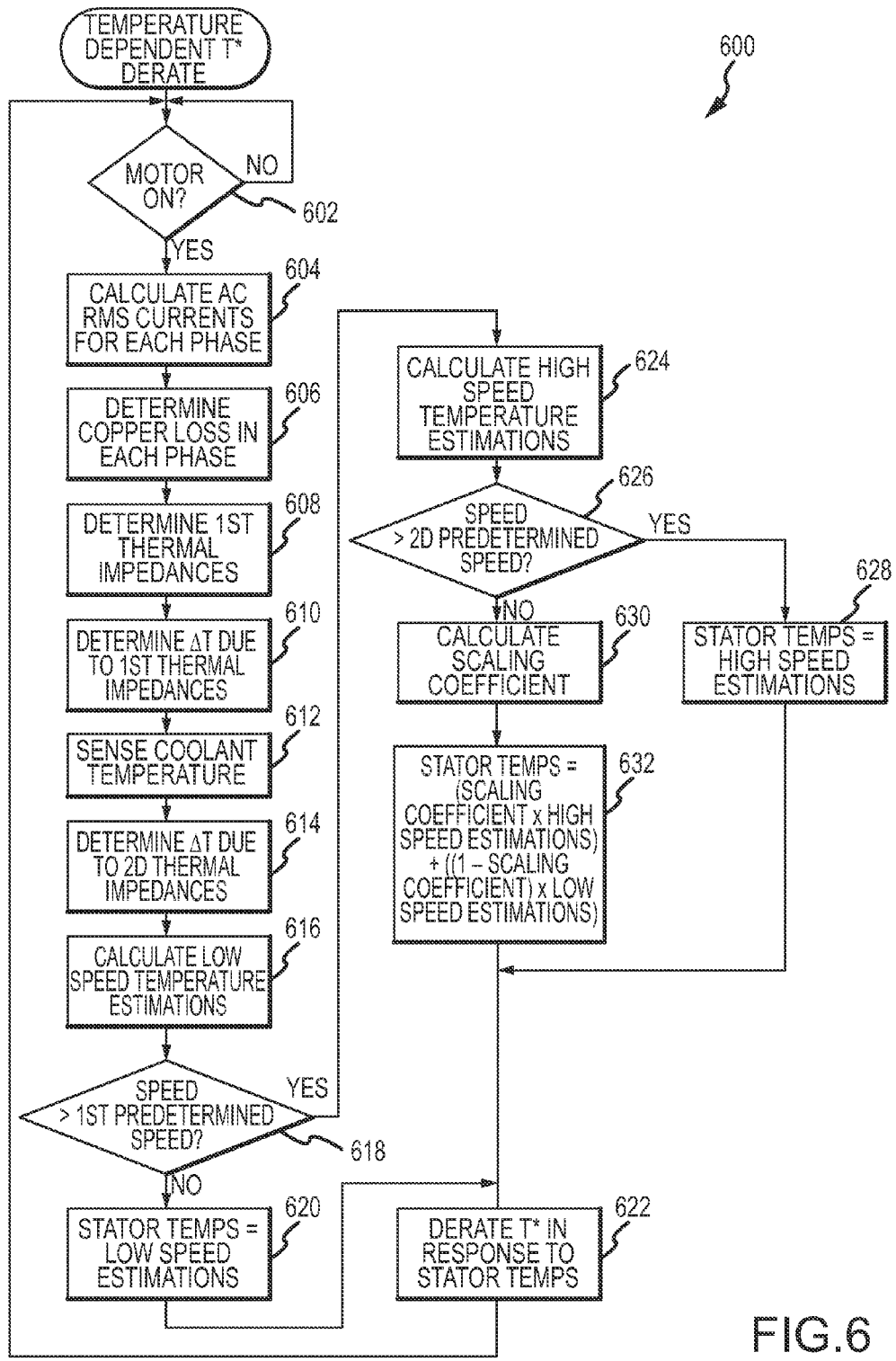
FIG. 6 illustrates a flowchart of the operation of a temperature estimation controller of the electric motor system of FIG. 3 in accordance with the embodiment of the present invention.

While FIG. 1 depicts the temperature estimation controller 170 including identifiable modules and blocks such as the high and low speed temperature estimation modules 174, 176, the scaling coefficient calculator 178, the transition module 180 and the temperature dependent torque command derater block 172, operation of the temperature estimation controller 170 could alternately be represented as software steps. Referring to FIG. 6, a flowchart 600 of the operation of the temperature estimation controller 170 of the electric motor system 100 in accordance with the embodiment of the present invention is illustrated.

Processing begins when the motor 110 is turned on 602. After processing determines that the motor 110 is turned on 602, an alternating current (AC) root mean square (RMS) current value is calculated 604 for each of the plurality of phases 115 of the motor 110. The copper loss of each of the plurality of phases 115 of the motor 110 is next calculated 606 in response to the AC RMS current values thereof, and first thermal impedances for each of the plurality of phases 115 of the motor 110 are calculated 608 in response to the copper loss calculated at step 606 for each of the plurality of phases 115.

Processing then determines 610 temperature rises in the stator windings of each of the phases 115 due to corresponding ones of the first thermal impedances calculated at step 608. After that, the signal on line 158 is sensed 612 indicating the temperature of the coolant 155 and a temperature rise due to a second thermal impedance of the thermal neutral is determined 614, the second thermal impedance of the thermal neutral being calculated with respect to the temperature of the coolant 155. Low speed stator temperatures for each of the phases 115 are then estimated 616 in response to the temperature rises in each of the phases due to corresponding ones of the first thermal impedances calculated at step 610 for each of the plurality of phases with respect to a thermal neutral, the second temperature rise due to the second thermal impedance of the thermal neutral calculated at step 614 and the temperature of the coolant 155 sensed at step 612.

Subsequently, processing determines whether the speed of the motor 110 is greater than a first predetermined speed 618, and, when the speed is less than (i.e., not greater than) the first predetermined speed 618, sets 620 the stator temperatures $T_a$, $T_b$ and $T_c$ equal to the estimated low speed stator temperatures from step 616. The torque command T* is then derated 622 to prevent overheating of one or more of the plurality of phases 115 of the motor 110 and processing returns to step 602.

When the speed is determined 618 to be greater than the first predetermined speed, the high speed stator temperatures of each of the plurality of phases are estimated 624 in response to a temperature measured by a thermistor 118 and processing determines 626 whether the speed of the motor 110 is greater than a second predetermined speed, where the first and second predetermined speeds are chosen as discussed in regards to FIG. 5. When the speed is greater than the second predetermined speed 626, the stator temperatures $T_a$, $T_b$ and $T_c$ are set equal to 628 the estimated high speed stator temperatures from step 624. The torque command T* is then derated 622 and processing returns to step 602.

When the speed of the motor 110 is greater than the first predetermined speed 618 but less than the second determined speed 626, a scaling coefficient value is calculated 630 in response to the speed of the motor 110. The stator temperatures $T_a$, $T_b$ and $T_c$ are then calculated 632 by summing (a) a product of the estimated high speed stator temperatures (from step 624) and the scaling coefficient value and (b) a product of the low speed stator temperatures (from step 616) and a difference between one and the scaling coefficient. The torque command T* is then derated 622 and processing returns to step 602.

While the flowchart 600 addresses a software representation of the operation of the temperature estimation controller 170, it is not necessary for operation in accordance with the present invention to have two separate controllers 150, 170 as depicted in FIG. 1. An alternate embodiment of the present invention could implement the functionality of both controllers 150, 170 in a single controller or processor. Further, some or all of the operation discussed hereinabove could be implemented in a higher level controller, such as the controller which, as is well known to those skilled in the art, generates the torque command T*.

Figure 7:
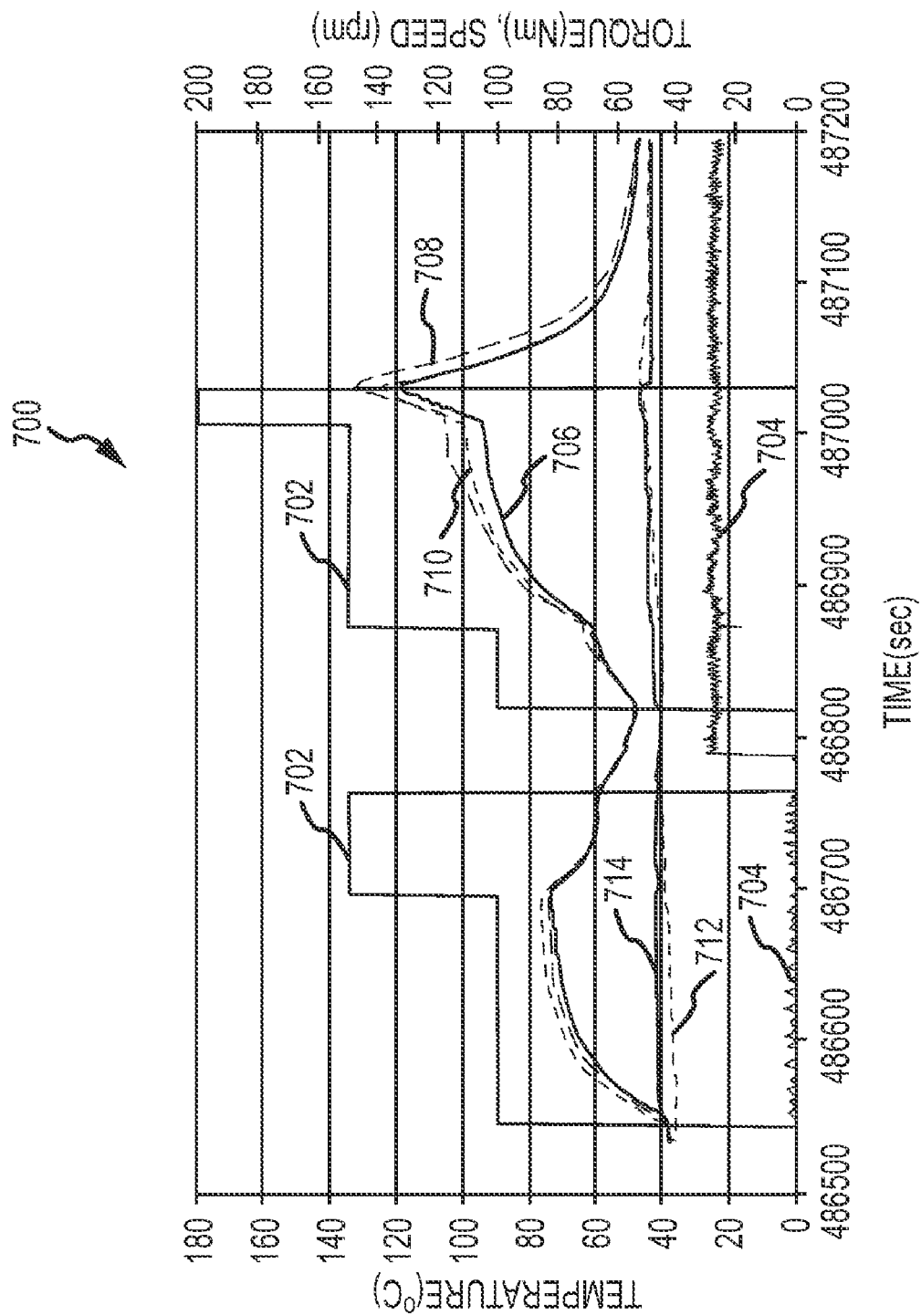
FIG. 7 illustrates waveforms generated during operation of a motor vehicle utilizing the electric motor system of FIG. 3 in accordance with the embodiment of the present invention.

Referring to FIG. 7, a graph 700 illustrates waveforms generated during operation of the electric motor system 100 in accordance with the present embodiment. Time in seconds is shown along the x-axis, while the y-axis shows either temperature in degrees Centigrade, torque in Newton-meters or speed of the motor 110 in revolutions per minute (rpms). Trace 702 shows the torque command T* provided to the motor 110 before derating in accordance with the present embodiment and trace 704 shows the speed of the motor 110. From trace 704, it can be seen that the motor is operating at or near zero speed (i.e., at a low speed) until approximately 486790 seconds and that the motor increases speed thereafter to another low speed below 75 rpms (to, for example, 25 rpms). Various torque command values 702 are provided at both zero speed and the low speed (25 rpms), as well as at the high speed.

Trace 706 shows the temperature of the motor 110, while a measured temperature of one of the phases 115 is shown on trace 708 and an estimated temperature of the one of the phases 115 as estimated in accordance with the present embodiment is shown on trace 710. It can be seen that these temperatures (on traces 706, 708 and 710) are approximately equal despite changes in the motor speed (on trace 704) and/or the torque command T* (on trace 702).

The temperature of the coolant 155 is shown on trace 712 and the temperature of the thermal neutral 202 is shown on trace 714. It will be noted that these temperatures increase in the continued presence of motor operation. However, even with the increase in these values, derating the Torque command T* in accordance with the present embodiment provides protection of the stator windings of the phases from damage due to overheating. In addition, the present embodiment provides a robust method for temperature estimation where the temperature in each of the phases 115 of a motor 110 can be accurately estimated without providing a thermistor in each phase 115, even at or near zero speed of the motor 110.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling a torque command to prevent overheating of one or more of a plurality of phases of a permanent magnet motor, the method comprising the steps of:
    determining whether a detected speed of the permanent magnet motor is less than a first predetermined speed;
    calculating a copper loss of each of the plurality of phases of the permanent magnet motor in response to an alternating current (AC) root mean square (RMS) current of each of the plurality of phases;
    calculating first thermal impedances for each of the plurality of phases in response to the copper loss of each of the plurality of phases;
    estimating a stator temperature of each of the plurality of phases in response to the first thermal impedances for each of the plurality of phases with respect to a thermal neutral when the detected speed of the permanent magnet motor is less than the first predetermined speed; and
    derating the torque command in response to the stator temperature of one or more of the plurality of phases.

2. The method in accordance with claim 1 wherein the step of estimating the stator temperature of each of the plurality of phases comprises the steps of:
    calculating a second thermal impedance of the thermal neutral with respect to a coolant temperature; and
    estimating the stator temperature of each of the plurality of phases of the permanent magnet motor in response to the coolant temperature, first temperature rises due to corresponding ones of the first thermal impedances, and a second temperature rise due to the second thermal impedance.

3. The method in accordance with claim 1 further comprising the steps of:
    determining whether the detected speed of the permanent magnet motor is greater than a second predetermined speed; and
    estimating the stator temperature of each of the plurality of phases in response to a temperature measured by a thermistor connected to one of the plurality of phases of the permanent magnet motor when the detected speed of the permanent magnet motor is greater than the second predetermined speed.

4. The method in accordance with claim 3 further comprising the step of estimating the stator temperature of each of the plurality of phases in response to both the first thermal impedances and the temperature measured by the thermistor when the detected speed of the permanent magnet motor is greater than the first predetermined speed and less than the second predetermined speed.

5. The method in accordance with claim 4 wherein the step of estimating the stator temperature of each of the plurality of phases when the detected speed of the permanent magnet motor is greater than the first predetermined speed and less than the second predetermined speed comprises the steps of:
    calculating a scaling coefficient in response to the detected speed; and
    estimating the stator temperature of each of the plurality of phases in response to the first thermal impedances, the temperature measured by the thermistor and the scaling coefficient when the detected speed of the permanent magnet motor is greater than the first predetermined speed and less than the second predetermined speed.

6. The method in accordance with claim 5 wherein the step of estimating the stator temperature of each of the plurality of phases in response to the first thermal impedances, the temperature measured by the thermistor and the scaling coefficient comprises the step of estimating the stator temperature of each of the plurality of phases in response to a sum of a product of the first thermal impedances and the scaling coefficient and a product of the temperature measured by the thermistor and a difference between one and the scaling coefficient.

7. The method of claim 1, wherein the step of calculating the copper loss comprises the step of calculating the AC RMS current of each of the plurality of phases of the permanent magnet motor.

8. A temperature estimation controller for a permanent magnet motor comprising:
    a low speed temperature estimation module for estimating a stator temperature of each of a plurality of phases of the permanent magnet motor in response to first thermal impedances calculated for each of the plurality of phases with respect to a thermal neutral, wherein the low speed temperature estimation module:
    receives a coolant temperature signal;
    calculates a second thermal impedance with respect to the thermal neutral in response to the coolant temperature signal; and
    estimates the stator temperature of each of the plurality of phases of the permanent magnet motor in response to first temperature rises due to corresponding ones of the first thermal impedances and a second temperature rise due to the second thermal impedance;
    a transition module coupled to the low speed temperature estimation module and outputting the stator temperature of each of the plurality of phases of the permanent magnet motor as determined by the low speed temperature estimation module when a detected speed of the permanent magnet motor is less than a first predetermined speed; and
a temperature dependent torque command derater block coupled to the transition module and derating a torque command in response to the stator temperature of one or more of the plurality of phases.

9. The temperature estimation controller in accordance with claim 8 further comprising a high speed temperature estimation module for estimating the stator temperature of each of the plurality of phases of the permanent magnet motor in response to a thermistor connected to one of the plurality of phases of the permanent magnet motor, wherein the transition module is further coupled to the high speed temperature estimation module and outputs the stator temperature of each of the plurality of phases of the permanent magnet motor as calculated by the high speed temperature estimation module when the detected speed of the permanent magnet motor is greater than a second predetermined speed.

10. The temperature estimation controller in accordance with claim 9 wherein the transition module outputs the stator temperature of each of the plurality of phases of the permanent magnet motor as determined by combining outputs of the low speed temperature estimation module and the high speed temperature estimation module when the detected speed of the permanent magnet motor is greater than the first predetermined speed and less than the second predetermined speed.

11. The temperature estimation controller in accordance with claim 10 further comprising a scaling coefficient calculator for calculating a scaling coefficient in response to the detected speed of the permanent magnet motor, wherein the transition module is coupled to the scaling coefficient calculator to receive the scaling coefficient therefrom and outputs the stator temperature of each of the plurality of phases of the permanent magnet motor in response to the scaling coefficient when the detected speed of the permanent magnet motor is greater than the first predetermined speed and less than the second predetermined speed.

12. The temperature estimation controller of claim 8, wherein the low speed temperature estimation module is configured to:
calculate a copper loss of each of the plurality of phases of the permanent magnet motor in response to an alternating current (AC) root mean square (RMS) current of each of the plurality of phases; and
calculate the first thermal impedances for each of the plurality of phases in response to the copper loss of each of the plurality of phases.

13. An electric motor system comprising:
a permanent magnet electric motor including a plurality of phases;
an inverter coupled to the plurality of phases of the permanent magnet electric motor and providing electric control therefor;
a coolant coupled to the permanent magnet electric motor for reducing a temperature thereof during operation;
a resolver coupled to the permanent magnet electric motor for detecting a speed thereof and generating a detected speed signal in response to the speed of the permanent magnet electric motor;
a thermistor coupled to one of the plurality of phases for determining a temperature thereof and generating a phase temperature signal in response to the temperature of the one of the plurality of phases;
a coolant temperature detector coupled to the coolant for determining a temperature thereof; and
a temperature estimation controller coupled to the inverter, the coolant temperature detector, and the resolver for:
calculating first thermal impedances for each of the plurality of phases based on a copper loss of each of the plurality of phases;
determining a second thermal impedance of a thermal neutral with respect to a coolant temperature signal received from the coolant temperature detector;
estimating a stator temperature of each of the plurality of phases of the permanent magnet electric motor in response to first temperature rises due to corresponding ones of the first thermal impedances with respect to the thermal neutral and a second temperature rise due to the second thermal impedance; and
derating a torque command to generate a derated torque command in response to the stator temperature of one or more of the plurality of phases when the detected speed signal is less than a first predetermined speed,
wherein the inverter provides electric control for the plurality of phases of the permanent magnet electric motor in response to the derated torque command.

14. The electric motor system of claim 13 wherein the temperature estimation controller is further coupled to the thermistor and estimates the stator temperature of each of the plurality of phases of the permanent magnet electric motor in response to the phase temperature signal when the detected speed signal is greater than a second predetermined speed.

15. The electric motor system of claim 14 wherein the temperature estimation controller estimates the stator temperature of each of the plurality of phases of the permanent magnet electric motor in response to the phase temperature signal and the first thermal impedances when the detected speed signal is greater than the first predetermined speed and less than the second predetermined speed.

16. The electric motor system of claim 15 wherein the temperature estimation controller comprises a scaling coefficient calculator coupled to the resolver for calculating a scaling coefficient in response to the detected speed signal, wherein the temperature estimation controller estimates the stator temperature of each of the plurality of phases of the permanent magnet electric motor in response to the phase temperature signal, the first thermal impedances and the scaling coefficient when the detected speed signal is greater than the first predetermined speed and less than the second predetermined speed.

17. The electric motor system of claim 13 wherein the permanent magnet electric motor is an alternating current (AC) synchronous electric motor.

18. The electric motor system of claim 13 wherein the inverter comprises a plurality of Insulated Gate Bipolar Transistors (IGBTs) coupled to the temperature estimation controller, the plurality of IGBTs controlling operation of the permanent magnet electric motor in response to the derated torque command.

* * * * *